J. H. SLATTERY.
NUT LOCK.
APPLICATION FILED JAN. 16, 1914.
1,190,333.
Patented July 11, 1916.
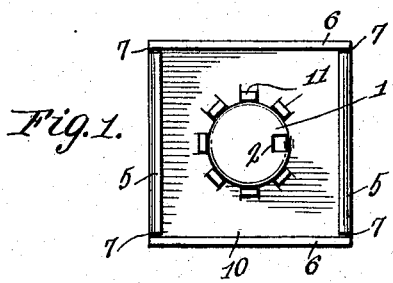
Fig. 1.
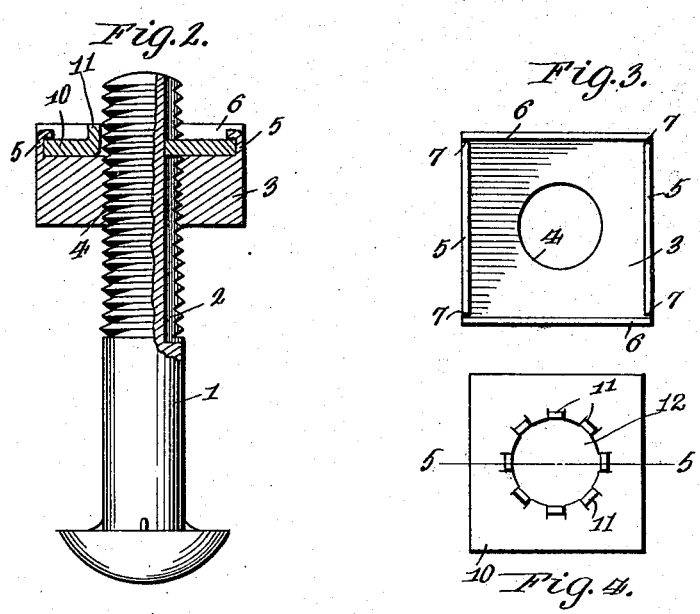
Fig. 2.
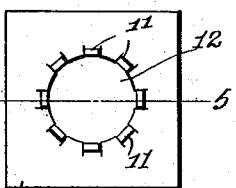
Fig. 3.
Fig. 4.
Fig. 5.
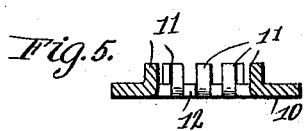
Witnesses
G. M. Spring.
Rob't Meyer.
Inventor
John H. Slattery,
By Richard Newen
his Attorney

UNITED STATES PATENT OFFICE.

JOHN H. SLATTERY, OF GREEN BAY, WISCONSIN.

NUT-LOCK.

1,190,333. Specification of Letters Patent. Patented July 11, 1916.

Application filed January 16, 1914. Serial No. 812,496.

*To all whom it may concern:*

Be it known that I, JOHN H. SLATTERY, a citizen of the United States, residing at Green Bay, in the county of Brown and State of Wisconsin, have invented certain new and useful Improvements in Nut-Locks, of which the following is a specification.

This invention relates to improvements in nut locks or means by which nuts may be prevented from rotation with respect to a bolt, or becoming gradually loosened by continuous use.

An object of this invention is the provision of a nut locking means which embodies a washer having a plurality of upstanding tongues formed marginally about the opening therein, one of which tongues is adapted for insertion into an elongated slot formed longitudinally in the bolt, after the nut has been properly placed thereon for preventing the rotation of the nut with respect to the bolt.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like or corresponding parts throughout the several views, and in which:—

Figure 1 is a plan view of the improved nut lock. Fig. 2 is a side elevation of the bolt showing the nut and washer for locking the nut upon the bolt, in cross section. Fig. 3 is a top plan view of the nut. Fig. 4 is a plan view of the washer, and Fig. 5 is a sectional view on the line 5—5 of Fig. 4.

Referring more particularly to the drawings by numerals, 1 designates a bolt of any suitable type of construction, which has an elongated shank provided with screw threads formed thereupon. The bolt 1 is also provided with an elongated slot 2, which extends longitudinally thereof, throughout the entire length of the threaded portion.

The nut 3, which serves the utility of an ordinary nut, such as is used in connection with the bolt, has the usual type of opening 4, extending therethrough, which opening is provided with internal screw threads for engagement with the external screw threads upon the bolt and it has projecting outwardly from its outer face, flanges 5 and 6. The flanges 5, which are formed upon opposite sides of the nut 3, extend practically across the entire length of the sides of the nut, but are disconnected from the flanges 6 by slight openings 7, as is clearly illustrated in Figs. 1 and 3 of the drawings. The flanges 5 and 6, form a recess in the outer surface of the nut, which receives a washer 10.

The washer 10 is constructed of any suitable type of material, of such pliability as to permit the tongues 11 to be straightened without danger of breaking. The tongues 11 are marginally disposed about the opening 12, which is centrally located in the washer 10 and are normally bent so as to extend upwardly at right angles to the body of the washer.

The washer 10 is inserted into the recess formed in the outer face of the nut 3 by the flanges 5 and 6, and is firmly and securely held therein, by bending the flanges 5, so that the outer portions thereof will firmly engage the outer surface of the washer as is clearly illustrated in Fig. 2 of the drawings. The flanges 5 may be annealed to render them sufficiently pliable for the purpose of bending for engagement with the washer 10.

When it is desired to lock the nut 3 upon the bolt, the nut is moved to the proper position upon the bolt and until one of the tongues 11 is positioned directly in alinement with the elongated slots or groove 2 formed in the bolt, the tongue 11 which is directly in alinement with the groove 2 is then bent or forced downwardly into the groove, and consequently prevents the rotation of the nut upon the bolt.

In practical fields, certain minor features of construction, combination and arrangement of parts may necessitate alterations to which the patentee is entitled provided such alterations are comprehended within the scope of what is claimed.

What is claimed is:

1. A nut lock, including, in combination with a bolt having a longitudinal groove therein, a nut on said bolt having one face thereof provided with a plurality of marginal flanges, a plate having a central opening complementally formed with the bore of the nut and provided with locking tongues for engagement in said groove, said plate being mounted upon said nut and securable thereto by bending certain of said flanges into engagement therewith.

2. The combination with a bolt having a longitudinal groove therein and a nut on said bolt, of a plate on said nut provided with a central opening and having a plurality of tongues anyone of which is to be bent for engagement in the groove, said nut having flanges bent for engagement with the plate to detachably retain the latter in position.

In testimony whereof I affix my signature in presence of two witnesses.

JOHN H. SLATTERY.

Witnesses:
 HUGO SCHWARTING,
 WILLIAM MESSNER.

Copies of this patent may be obtained for five cents each, by addressing the "Commissioner of Patents, Washington, D. C."